(12) United States Patent
Pusuluri et al.

(10) Patent No.: US 9,785,732 B2
(45) Date of Patent: Oct. 10, 2017

(54) VERIFICATION LOW POWER COLLATERAL GENERATION

(71) Applicant: NetSpeed Systems, San Jose, CA (US)

(72) Inventors: Vishnu Mohan Pusuluri, Bangalore (IN); Santhosh Patchamatla, Bangalore (IN); Rimu Kaushal, Bangalore (IN); Anup Gangwar, Bangalore (IN); Sailesh Kumar, San Jose, CA (US)

(73) Assignee: NetSpeed Systems, Inc., San Jose, CA (US)

( * ) Notice: Subject to any disclaimer, the term of this patent is extended or adjusted under 35 U.S.C. 154(b) by 0 days.

(21) Appl. No.: 14/738,487

(22) Filed: Jun. 12, 2015

(65) Prior Publication Data

US 2017/0228481 A1    Aug. 10, 2017

(51) Int. Cl.
*G06F 9/455*    (2006.01)
*G06F 17/50*    (2006.01)

(52) U.S. Cl.
CPC ...... *G06F 17/5018* (2013.01); *G06F 2217/78* (2013.01)

(58) Field of Classification Search
CPC ............. G06F 2217/78; G06F 17/5018; G06F 17/5022; G06F 11/24; G06F 17/5009; G06F 17/504; G06F 17/5045; G06F 17/5081
See application file for complete search history.

(56) References Cited

U.S. PATENT DOCUMENTS

| | | | | |
|---|---|---|---|---|
| 2008/0127014 A1* | 5/2008 | Pandey | ............... | G06F 17/5045 716/103 |
| 2009/0089725 A1* | 4/2009 | Khan | ............... | G01R 31/31721 716/106 |
| 2010/0242003 A1* | 9/2010 | Kwok | ................... | G06F 17/504 716/106 |
| 2011/0320991 A1* | 12/2011 | Hsu | ..................... | G06F 17/5022 716/103 |
| 2012/0198408 A1* | 8/2012 | Chopra | ................. | G06F 17/504 716/127 |
| 2013/0305207 A1* | 11/2013 | Hsieh | .................. | G06F 17/5009 716/136 |
| 2014/0013293 A1* | 1/2014 | Hsu | ..................... | G06F 17/5022 716/133 |

OTHER PUBLICATIONS

"Formal Verification of Circuit-Switched Network on Chip (NoC) Architectures using SPIN", by Aanam Zaman, OOsman Hasan, IEEE @2014.*

\* cited by examiner

*Primary Examiner* — Nha Nguyen
(74) *Attorney, Agent, or Firm* — Procopio, Cory, Hargreaves & Savitch LLP

(57) ABSTRACT

Aspects of the present disclosure relate to methods, systems, and computer readable mediums for generating transition state specifications that include information regarding low power behavior of a System on Chip (SoC) and/or a Network on Chip (NoC). Such transition state specifications can enable verification of switching behavior when elements/components of a SoC/NoC or a subset thereof switch from one power profile to another, or when the elements/components switch in stable states of power based on inputs such as voltages, clocks, power domains, and traffic.

14 Claims, 18 Drawing Sheets

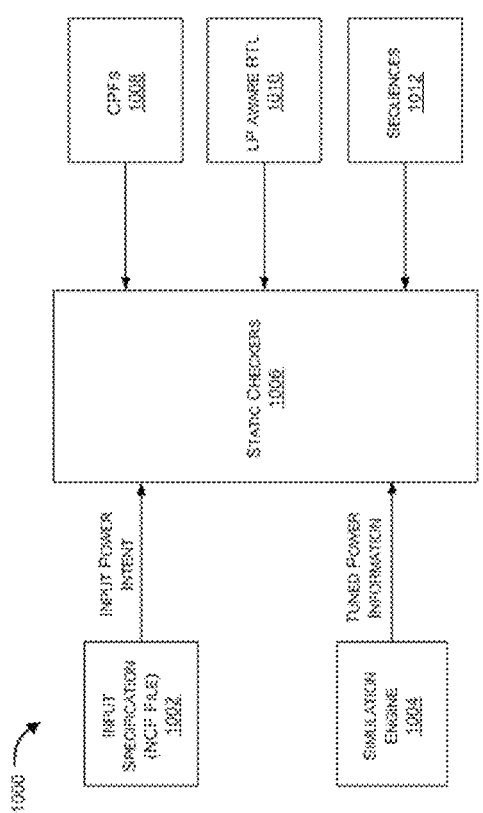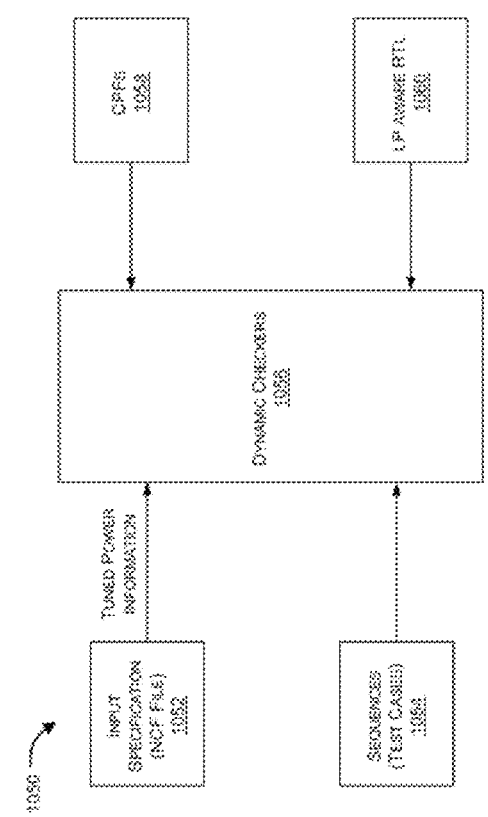

VERIFICATION LOW POWER COLLATERAL GENERATION

BACKGROUND

Technical Field

Methods and example implementations described herein are directed to interconnect architecture, and more specifically to generation of a specification indicative of low power behavior in a chip.

Related Art

The number of components on a chip is rapidly growing due to increasing levels of integration, system complexity and shrinking transistor geometry. Complex System-on-Chips (SoCs) may involve a variety of components e.g., processor cores, Digital Signal Processors (DSPs), hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs).

VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

A SoC/NoC can be configured to operate at different power profiles, where the SoC/NoC can switch from one power profile to another by taking a sequence of steps. Similarly, an component/element of the SoC/NoC can be configured to operate at different power profiles and switch from one power profile to another depending on the requirement. When a SoC/NoC changes from one power profile to another, several elements/components of the SoC/NoC need to change their power state, i.e. go ON/OFF. For example, when a SoC/NoC changes from power profile-1 to power profile-2, a plurality of elements/components may go from ON state to OFF state and other elements/components may go from OFF state to ON state. While defining different power profiles for SoC/NoC or element/component of SoC/NoC, the sequence of steps taken by the different elements/components can also be defined. During transition of elements/components or SoC/NoC from one power profile to another, the SoC/NoC can go from a stable state to a volatile state and hence different elements/components of the SoC/NoC may be in transition states. Stability of SoC/NoC therefore needs to be ensured/verified during these transition steps, and verification of the steps needs to be properly documented.

It is importance to ensure that power profile switching does not change the power status/properties of NoC/SoC elements/components, or abruptly switches OFF some elements that may not have completed their transition, or changes power status of elements without any requirement. Sequence of steps taken by the elements during power profile switching is equality important and need to be considered and complied with the defined input specification. Power profile specification and/or SoC specification can include steps that need to be taken when the power profile of the elements/components or of SoC/NoC needs to switch from one power profile to another. The input specification, which may be in the form of NCF file, may include the sequential steps that need to be taken by the elements/components of the SoC/NoC even if a single element/component switches from one power profile to another so as to ensure the stable state of SoC/NoC. During the transition process i.e. during switching from one power profile another, the sequence of steps actually taken by the elements/components needs to be checked/verified to ensure compliance with the given power profile of SoC/NoC and/or to ensure compliance with the given SoC specification.

Therefore, there exists a need for methods, systems, and computer readable mediums for generating a specification that can be used by verification mechanism for verifying behavior of a SoC/NoC when elements/components of the SoC/NoC switch from one power profile to another.

SUMMARY

Aspects of the present disclosure relate to methods, systems, and computer readable mediums for generating transition state specifications that include information regarding low power behavior of a System on Chip (SoC) and a Network on Chip (NoC). Such transition state specifications can enable verification of switching behavior when elements/components of a SoC/NoC or a subset thereof switch from one power profile to another, or when the elements/components switch in stable states of power based on inputs such as voltages, clocks, power domains, and traffic.

In an aspect, an expected transition state specification can include one or more functions/checkers for checking/verifying the behavior of the SoC/NoC during such transition/switching. In an example implementation, the expected transition state specification can be generated for each SoC/NoC or for an element/component of the SoC/NoC or for a subset of the SoC/NoC. In an example implementation, the transition state specification can include expected status of different participating elements/components when they switch from one power profile to another, expected power/voltage values at different points, expected frequency status, clock status, and other like parameters of the elements/components of the SoC/NOC.

In an example implementation, an actual transition state specification can be generated based on the actual steps taken by the elements/components of the SoC/NoC, actual power/voltage/current values at different points in the SoC/NoC, power status, frequency status, clock status, and other like parameters of the elements/components of the SoC/NOC collected at runtime or at the time of simulation of the SoC/NoC. The actual transition state specification can incorporate information about elements/components that have changed their power state. For instance, the actual transition state specification can incorporate elements/components that have gone from ON state to OFF state, and elements/components that have gone from OFF state to ON state. In an example implementation, the actual sequence of switching and instructions issued by the master elements for change in power properties of elements (say slave elements) can also be incorporated in the actual transition state specification.

In an example implementation, the actual transition state specification can be compared with user defined input specification or traffic specification of SoC/NoC or with generic specification of the SoC/NoC to ensure/verify the behavior/correctness/stability of the SoC/NoC. In another example implementation, the expected transition state specification can be compared with the actual transition state specification for verifying the correctness of the SoC/NoC while switching from one power profile to another. In an example implementation, the expected transition state specification can incorporate low power profile collateral information, which can be used to verify the behavior of the SoC/NoC against predefined power intent specification. In an example implementation, the power intent specification can be a part of the SoC/NoC specification provided by the user or can be part of the expected transition state specification.

According to an embodiment, the transition state specification can be generated in a suitable language in one or more predefined file formats, which can be utilized by a behavior verification methodology that can apply one or more functions/checkers for verifying the behavior/correctness/stability of the SoC/NoC. In an embodiment, generating the specification can include generating one or more assertions or invariants that can be utilized by a behavior verification methodology and that can apply one or more functions/checkers for verifying the behavior correctness of the SoC/NoC. In an example implementation, the transition state specification can be written and stored in a System Verilog language and suitable format or in any other hardware description language and suitable format. In an example, the transition state specification can be written and stored in the form of files or in form of assertions or invariants that can be used by the verification methodology being applied to verify the correctness of the SoC/NoC.

In an aspect, the transition state specification can be configured to include information that can support both dynamic and static verification of design and power intent of the SoC/NoC. According to an embodiment, the specification can be generated hierarchically and can be presented to the verification functions for verifying the behavior of elements/components of the SoC/NoC or of a subset of SoC/NoC or entire SoC/NoC in a hierarchical manner. In an example implementation, the transition state specification can be used by the verification function for verifying the behavior/correctness/stability of the SoC/NoC at a unit level or at a group/cell level, or at a full-chip level. In an example implementation, the transition state specification can be used by verification function for verifying the behavior/correctness/stability either within a hardware element/component of the SoC/NoC, or across the hardware elements of the SoC/NoC.

In an embodiment of the present disclosure, the transition state specification can include one or more power profile verification templates/checkers that can be used for verifying the behavior of different elements/components of the SoC/NoC. In an example implementation, a single template can be used for verification of behavior/correctness/stability of a plurality of elements/components of the SoC/NoC.

According to an embodiment of the present disclosure, correctness/compatibility of generated power intent of the generated specification can be verified against original input specification of the SoC/NoC. In an example implementation, the generated specification can be used to inject events such as isolation events into a design during a hardware simulation for the SoC/NoC. In an example implementation, the generated specification can be used for observing/checking power/current/voltage values for input/output interfaces and wires to ensure compliance with a protocol specification for the SoC/NoC.

An embodiment of the present disclosure provides a computer readable medium for generating a transition state specification, which includes information regarding low power profile behavior of elements/components of a SoC/NOC, wherein the transition state specification can be used for verifying behavior/correctness of elements/components of SoC/NOC when the elements/component of the SoC/NoC switch from one power profile to another.

BRIEF DESCRIPTION OF THE DRAWINGS

FIG. 10(a) illustrates an example static checker for verifying the behaviour of SoC/NoC in accordance with an embodiment of the present disclosure.

FIG. 10(b) illustrates an example dynamic checker for verifying the behaviour of SoC/NoC in accordance with an embodiment of the present disclosure.

DETAILED DESCRIPTION

Figure 1A:
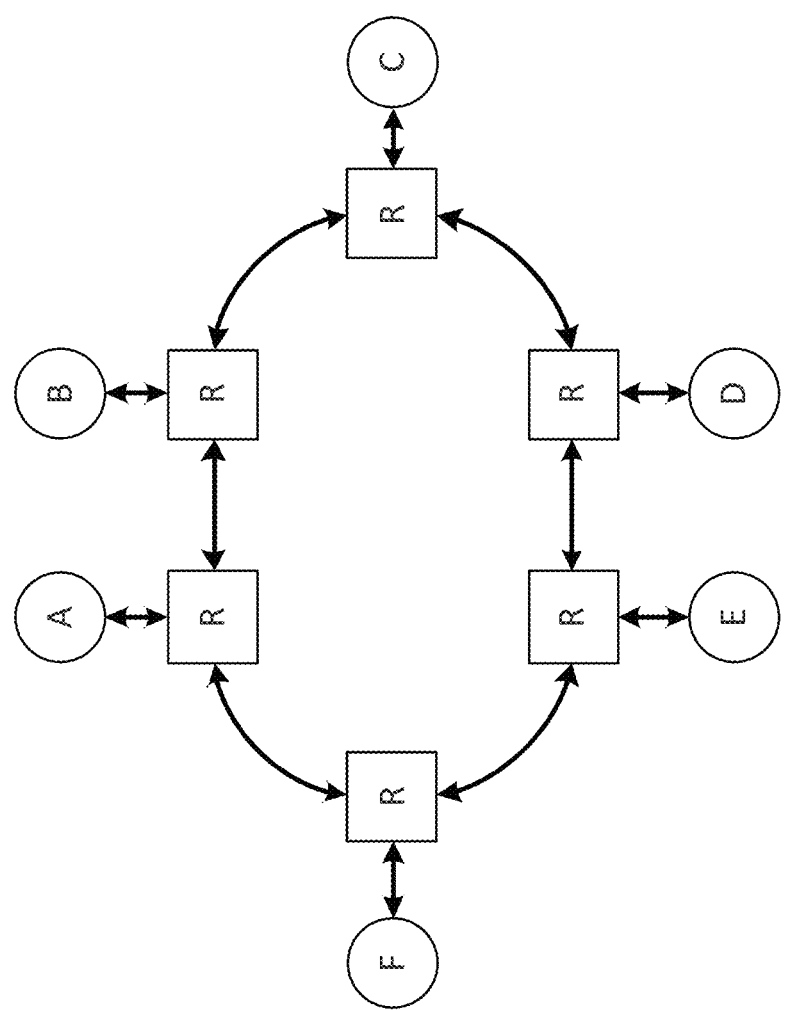
FIGS. 1(a), 1(b) 1(c) and 1(d) illustrate examples of Bidirectional ring, 2D Mesh, 2D Taurus, and 3D Mesh NoC Topologies.
Figure 1B:
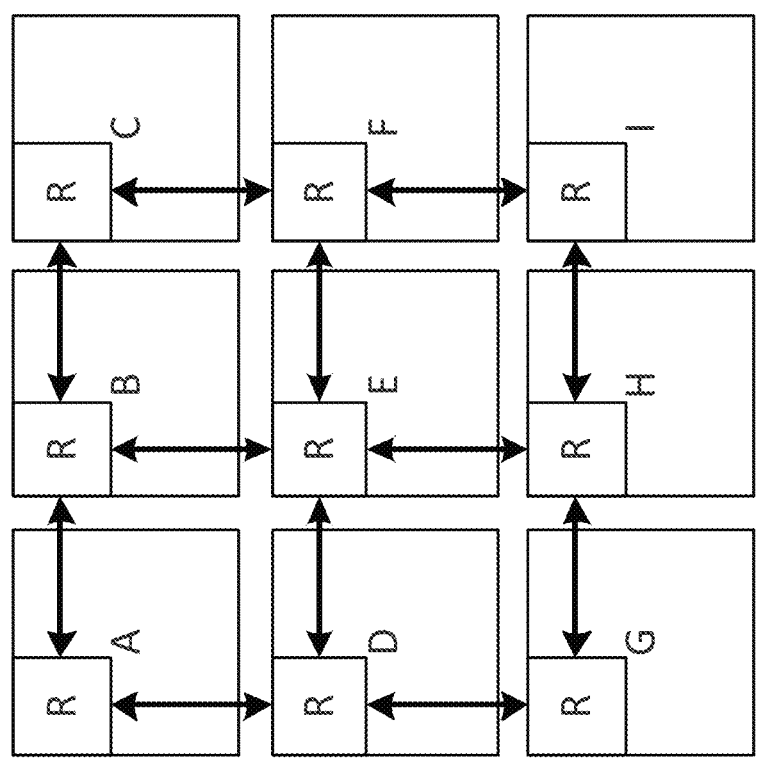
Figure 1C:
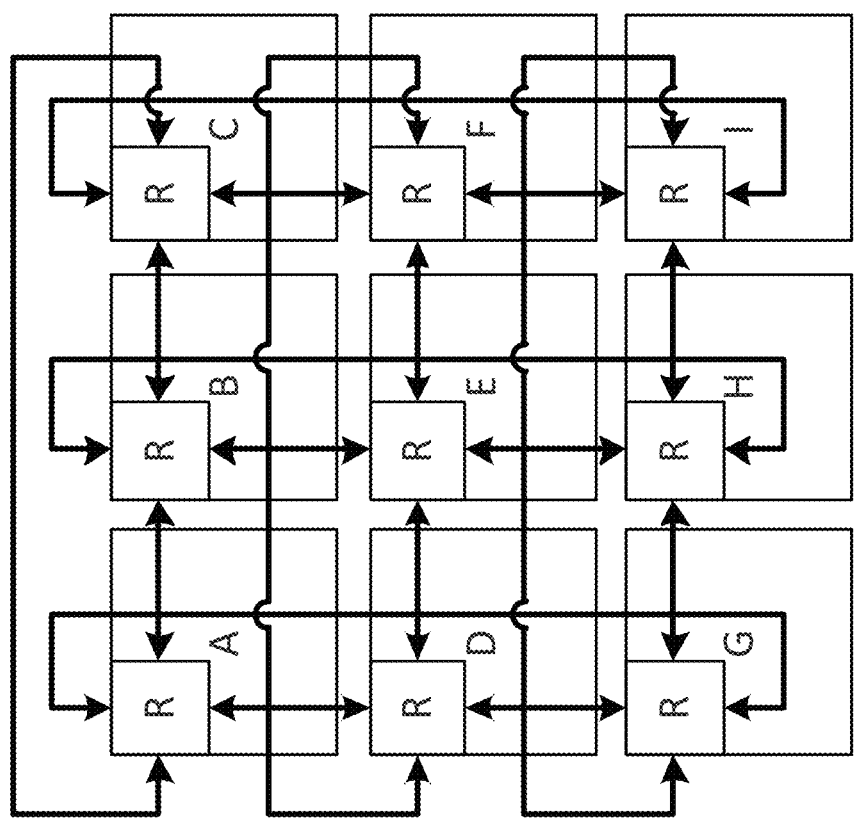
Figure 1D:
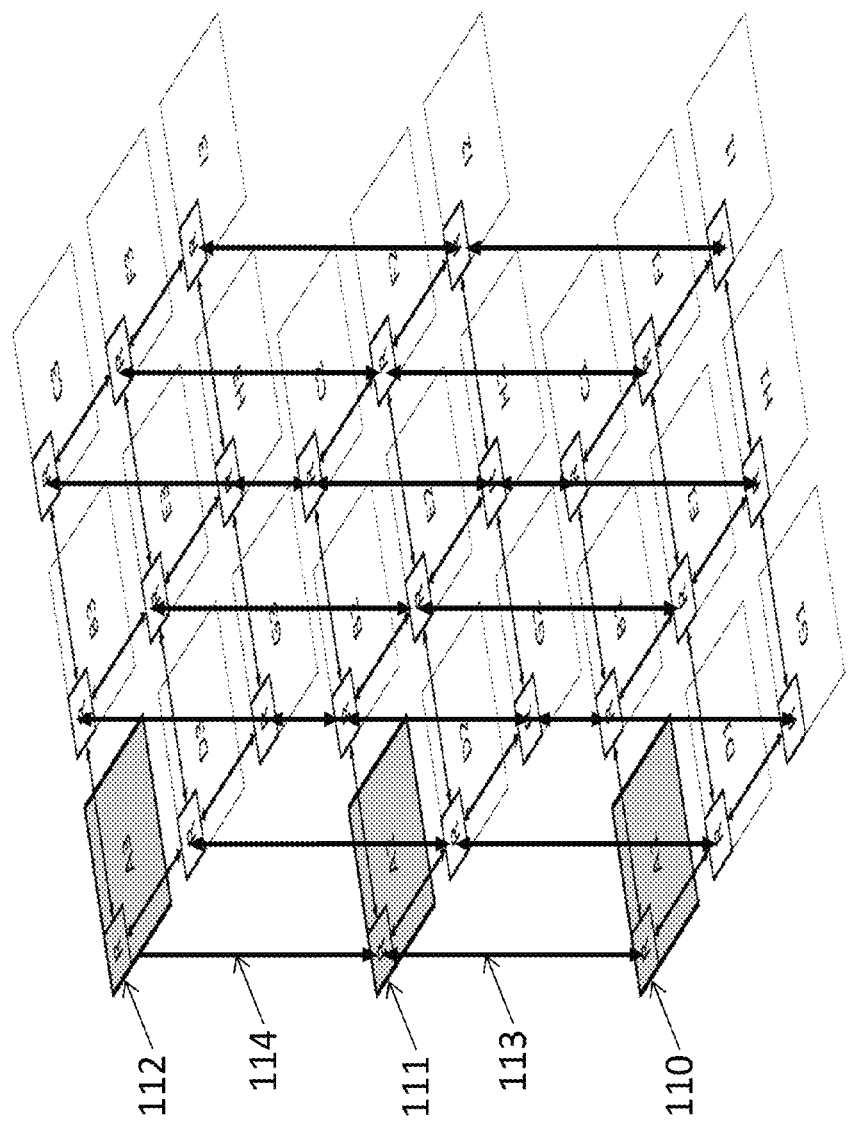
Figure 2A:
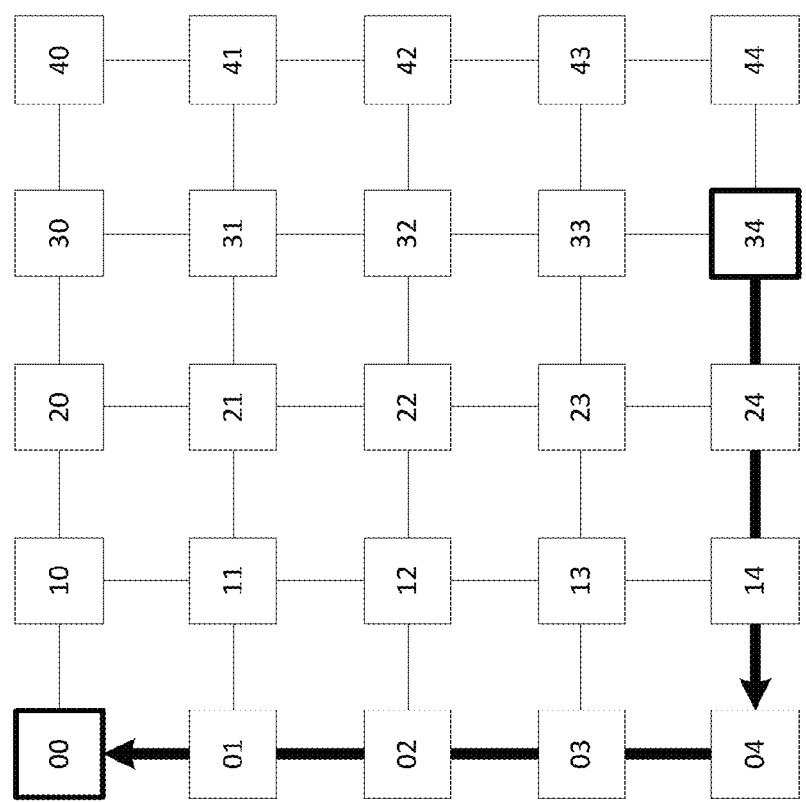
FIG. 2(a) illustrates an example of XY routing in a related art two dimensional mesh.
Figure 2B:
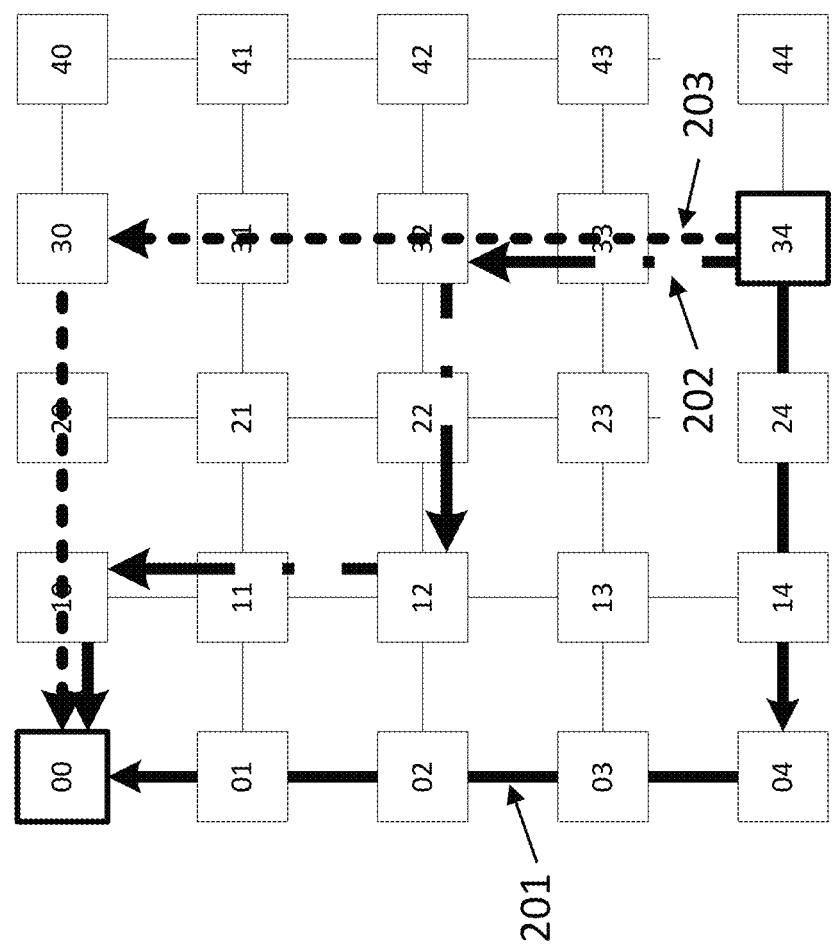
FIG. 2(b) illustrates three different routes between a source and destination nodes.
Figure 3A:
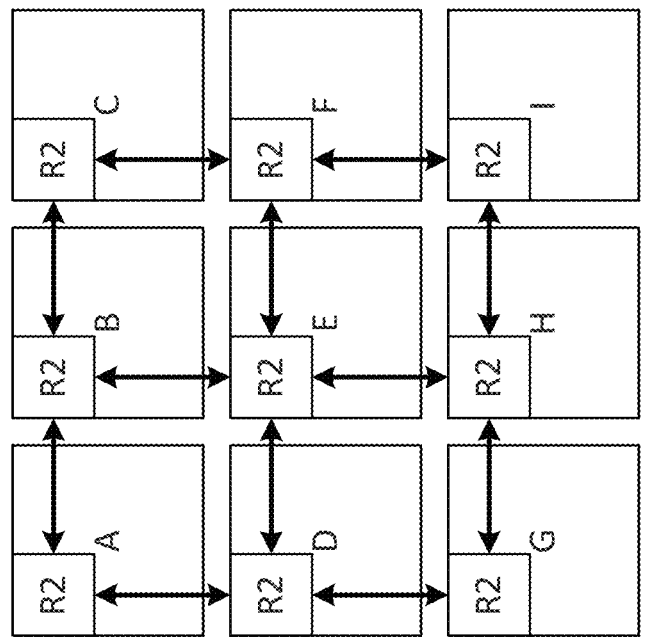
FIG. 3(a) illustrates an example of a related art two layer NoC interconnect.
Figure 3A:
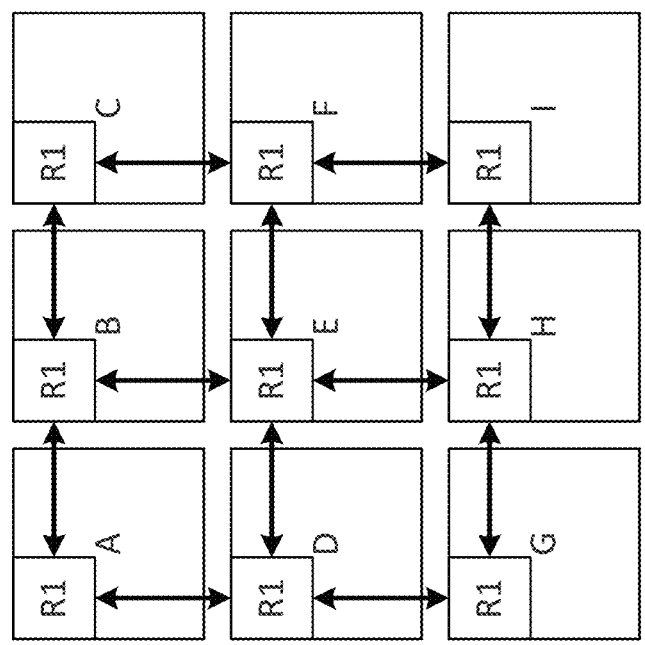
Figure 3B:
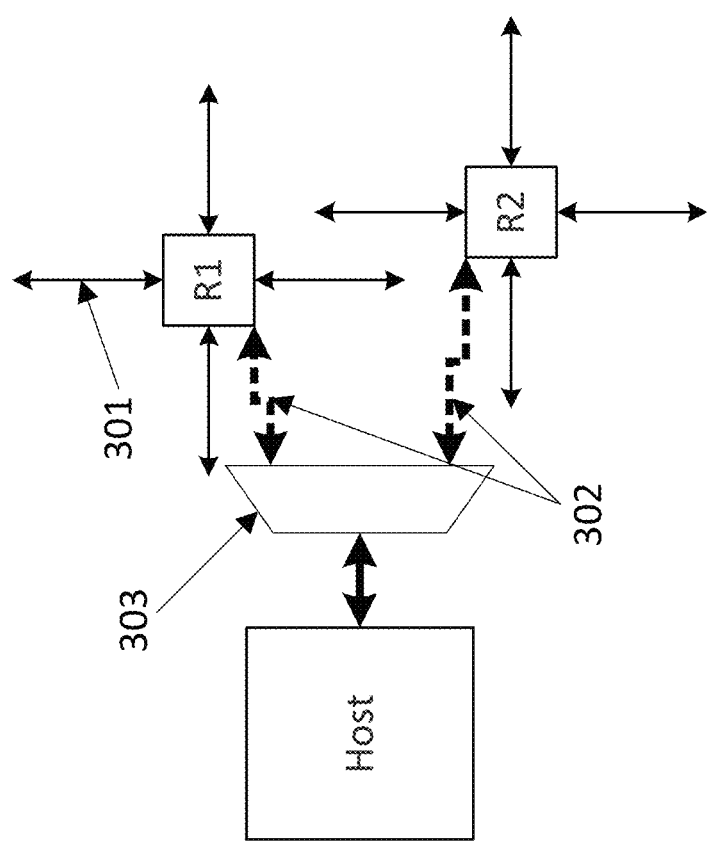
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Aspects of the present disclosure relate to methods, systems, and computer readable mediums for generating transition state specifications that include information regarding low power behavior of a System on Chip (SoC) and a Network on Chip (NoC). Such transition state specifications can enable verification of switching behavior when elements/components of a SoC/NoC or a subset therefore switch from one power profile to another, or when the elements/components switch in stable states of power based on inputs such as voltages, clocks, power domains, and traffic.

In an aspect, an expected transition state specification can include one or more functions/checkers for checking/verifying the behavior of the SoC/NoC during such transition/switching. In an example implementation, the expected transition state specification can be generated for each SoC/NoC or for an element/component of the SoC/NoC or for a subset of the SoC/NoC. In an example implementation, the transition state specification can include expected status of different participating elements/components when they switch from one power profile to another, expected power/voltage values at different points, expected frequency status, clock status, and other like parameters of the elements/components of the SoC/NOC.

In an example implementation, an actual transition state specification can be generated based on the actual steps taken by the elements/components of the SoC/NoC, actual power/voltage/current values at different points in the SoC/NoC, power status, frequency status, clock status, and other like parameters of the elements/components of the SoC/NOC collected at runtime or at the time of simulation of the SoC/NoC. The actual transition state specification can incorporate information about elements/components that have changed their power state. For instance, the actual transition state specification can incorporate elements/components that have gone from ON state to OFF state, and elements/components that have gone from OFF state to ON state. In an example implementation, the actual sequence of switching and instructions issued by the master elements for change in power properties of elements (say slave elements) can also be incorporated in the actual transition state specification.

In an example implementation, the actual transition state specification can be compared with user defined input specification or traffic specification of SoC/NoC or with generic specification of the SoC/NoC to ensure/verify the behavior/correctness/stability of the SoC/NoC. In another example implementation, the expected transition state specification can be compared with the actual transition state specification for verifying the correctness of the SoC/NoC while switching from one power profile to another. In an example implementation, the expected transition state specification can incorporate low power profile collateral information, which can be used to verify the behavior of the SoC/NoC against predefined power intent specification. In an example implementation, the power intent specification can be a part of the SoC/NoC specification provided by the user or can be part of the expected transition state specification.

According to an embodiment, the transition state specification can be generated in a suitable language in one or more predefined file formats, which can be utilized by a behavior verification methodology that can apply one or more functions/checkers for verifying the behavior/correctness/stability of the SoC/NoC. In an embodiment, generating the specification can include generating one or more assertions or invariants that can be utilized by a behavior verification methodology and that can apply one or more functions/checkers for verifying the behavior correctness of the SoC/NoC. In an example implementation, the transition state specification can be written and stored in a System Verilog language and suitable format or in any other hardware description language and suitable format. In an example, the transition state specification can be written and stored in the form of files or in form of assertions or invariants that can be used by the verification methodology being applied to verify the correctness of the SoC/NoC.

In an aspect, the transition state specification can be configured to include information that can support both dynamic and static verification of design and power intent of the SoC/NoC. According to an embodiment, the specification can be generated hierarchically and can be presented to the verification functions for verifying the behavior of elements/components of the SoC/NoC or of a subset of SoC/NoC or entire SoC/NoC in a hierarchical manner. In an example implementation, the transition state specification can be used by the verification function for verifying the behavior/correctness/stability of the SoC/NoC at a unit level or at a group/cell level, or at a full-chip level. In an example implementation, the transition state specification can be used by verification function for verifying the behavior/correctness/stability either within a hardware element/component of the SoC/NoC, or across the hardware elements of the SoC/NoC.

In an embodiment of the present disclosure, the transition state specification can include one or more power profile verification templates/checkers that can be used for verifying the behavior of different elements/components of the SoC/NoC. In an example implementation, a single template can be used for verification of behavior/correctness/stability of a plurality of elements/components of the SoC/NoC.

According to an embodiment of the present disclosure, correctness/compatibility of generated power intent of the generated specification can be verified against original input specification of the SoC/NoC. In an example implementation, the generated specification can be used to inject events such as isolation events into a design during a hardware simulation for the SoC/NoC. In an example implementation, the generated specification can be used for observing/checking power/current/voltage values for input/output interfaces and wires to ensure compliance with a protocol specification for the SoC/NoC.

An embodiment of the present disclosure provides a computer readable medium for generating a transition state specification, which includes information regarding low power profile behavior of elements/components of a SoC/NOC, wherein the transition state specification can be used for verifying behavior/correctness of elements/components of SoC/NOC when the elements/component of the SoC/NoC switch from one power profile to another.

Figure 4:
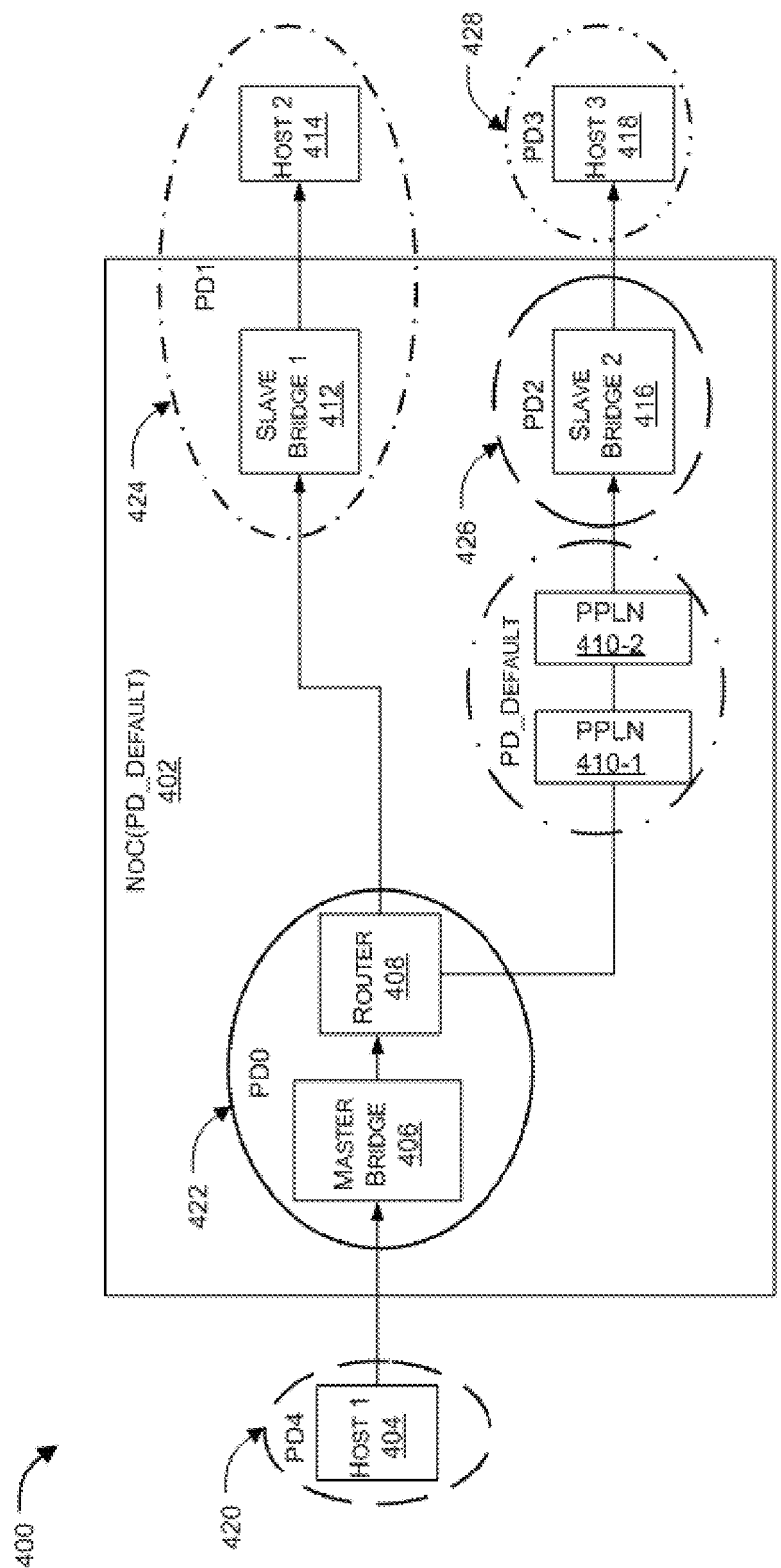
FIG. 4 illustrates an example NoC that is configured to operate at different power profiles for which a transition state specification can be generated in accordance with an example embodiment of the present disclosure.

FIG. 4 illustrates an example representation 400 of a NoC 402 that is configured to operate at different power profiles for which transition state specification can be generated in accordance with an example embodiment of the present disclosure. As shown in FIG. 4, NoC 402 can have a plurality of NoC elements, such as master bridge 406, router 408, slave bridge-1 412, and slave bridge-2 416, among other NoC elements, which may be configured to operate at different power profiles and for which the transition state specification can be generated. In an example implementation, the master bridge 406 can be configured to control the power status of slave bridge-1 412 and slave bridge-2 416, wherein upon receiving the instructions at the master bridge 406 for switching power profiles of one more network elements such as router 408, slave bridge-1 412 and slave bridge-2 416, the master bridge 406 can forward the instructions to the network elements to switch from one power profile to another, which action is power switching can be controlled by a power controller to the NoC or part thereof.

In example implementation, change in power profile can include change of different power properties such as voltage values, power status, frequency of operations, clock frequency etc. of the network/hardware elements. In an example implementation, some of the network elements such as pipeline stages PPLN 410-1 and PPLN 410-2 may remain in a default power domain (PD_Default) and don't change their power profile when other elements switch from one power profile to another. In example implementation, NoC 402 can be configured to maintain a power profile similar to Host-1 404, or Host-2 414, or Host-3 418 that are located near the NoC 402 in a circuit. In an example implementation, one or more groups of network components or hardware elements can be virtually created based on similarity of power profiles. In an example implementation, logical groups of network elements that pose similar power properties can be created, and can be differentiated with other such logical groups based on the power properties. For example, network elements such as master bridge 406 and router 408 of logical group 422 may be configured to operate with different power properties as compared to logical group 420, logical group 424, logical group 426, and logical group 428.

In an example implementation, power profile/properties and/or sequence of steps to be taken during switching from one power profile to another can be defined and provided in an input specification, also referred to as NoC specification hereinafter. Power profile/properties including power domain information, voltage domain information, voltage values, frequency values, among others of SoC/NoC can be provided as part of the input specification.

Based on the input specifications that includes details of plurality of power profiles for a SoC/NoC, an expected transition state specification can be generated, which can include information relating to expected sequence of steps to be taken by each network element, power status of each hardware element, and other like power properties of network elements/hardware components when the SoC/NoC switches from one power profiler to another. In an example implementation, the expected transition state specification can be written in any hardware description language (DSL) such as system verilog, and can be stored in form of a file or in form of assertions or invariants.

In an example implementation, transition state specification can include information regarding low power behavior of System on Chip (SoC) and/or Network on Chip (NoC). For instance, NoC 402 can enable verification of the system/switching behavior when elements/components of the NoC 402 or a subset of the SoC/NoC (also referred to as a group of network elements/hardware components such as group 422, 424, and 426) or the entire SoC/NoC, switch from one power profile to another. The transition state specification can also include one or more functions for checking/verifying the behavior of the SoC/NoC. In an example implementation, an expected transition state specification can be generated for each SoC/NoC and/or specific elements/components of the SoC/NoC and/or a subset of the SoC/NoC.

In an example implementation, the expected transition state specification can include expected status of different participating elements/components, expected values at different points, expected frequency status, clock status, and other like expected parameters of the elements/components of the SoC/NOC when an element/component of the SoC/NoC switches from one power profile to another.

In an example implementation, system of the present disclosure further enables generation of an actual transition state specification, wherein the actual transition state specification can incorporate information/log of actual steps taken by the elements/components of SoC/NoC, actual values at different points in the SoC/NoC, power status, frequency status, clock status, and other like parameters of the elements/components of the SoC/NOC, which can be collected at runtime or at the time of simulation of the SoC/NoC. The actual transition state specification can incorporate information about elements/components that have changed their power state. For instance, the actual transition state specification can include elements/components that have gone from ON state to OFF state and/or elements/components that have gone from OFF state to ON state. In an example implementation, the actual sequence of switching can also be incorporated in the transition state specification.

In an example implementation, the actual transition state specification can be compared with user defined input specification or with traffic specification or with the SoC/NoC generic specification to verify the behavior/correctness/stability of the SoC/NoC. In another example implementation, the expected transition state specification can be compared with the actual transition state specification to verify the correctness of the SoC/NoC while switching from one power profile to another. In an example implementation, the transition state specification can incorporate low power profile collateral information, which can be used to verify behavior of the SoC/NoC against predefined power intent specification. In an example implementation, power intent specification can be part of the SoC/NoC specification provided by the user or can be part of the expected transition state specification.

In another aspect, the actual transition state specification can be generated during simulation or during actual working of the SoC/NoC to match with the reference specification so as to ensure smooth switching of power profiles without disturbing the stability of the SoC/NoC.

In an aspect, the SoC/NoC can generate an alert when the verification function that uses the transition state specification identifies an unusual behavior or out of sequence execution of instructions or unwanted change of power properties of any element of the SoC/NoC. In an example implementation, behavior of the SoC/NoC can be observed in real-time using actual transition state specification.

In an aspect, the transition state specification can be configured to include information that can support both dynamic and static verification of design and power intent of the SoC/NoC. According to an embodiment, the specification can be generated hierarchically, which can be presented to verification functions for verifying the behavior of elements/components of the SoC/NoC or of a subset of SoC/NoC, or of the entire SoC/NoC in hierarchical manner.

In an example implementation, transition state specification can use different checkers at different virtual or physical hierarchies to verify the sequencing of power domain controls. The checkers can verify the sequence of issued power domain controls with respect to expected order of sequence as provided in the input or design specification of the SoC/NoC. In an example implementation, the checkers can be configured to verify that the isolation is performed only when there is a domain crossing.

In an example implementation, different checkers can be bound to the NoC top level for observing and verifying low power behavior across the power domain and elements. The checkers can verify whether the power sequencing done across the power domains is in the order, or whether the elements present across power domains have drained/completed the outstanding transactions. In an example implementation, different checkers can verify where power sequencing done across the elements in a given traffic profile are in expected order. In an example implementation, different checkers can verify where the connected masters to the given slaves are fenced and drained before starting power gating sequence of the slave(s). For example, when a display is not being used, the system needs to switch OFF the display engine and the graphics engine of the system, and hence power states of these engines need to change from ON state to OFF state. In the given example, in power profile-1, the display engine and the graphics engine may be OFF, and in power profile-2 the display engine and the graphics engine may be ON. When the display of system is not in use, the system changes from power profile-1 to power profile-2, wherein, during such switching, the system needs to ensure that the steps taken for switching OFF the display engine and the graphics engine is as per the input specification. The transition state specification can verify that the power control signal has been issued by the power controller and goes to these two engines.

In example implementations, the actual steps and control signals sent by one or more network elements and/or power control units can be snooped and/or polled to be included in the transition state specification, which can be used to verify that the such signals were issued or not.

Figure 5:
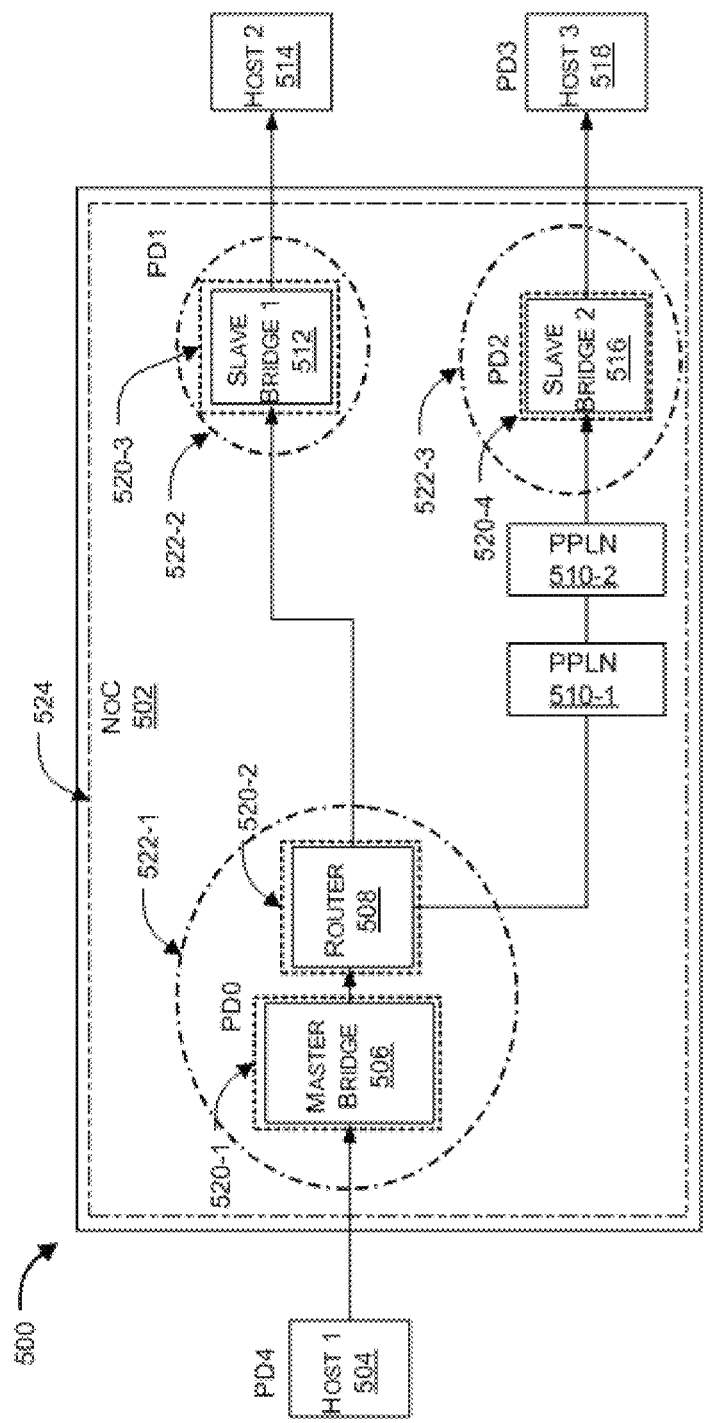
FIG. 5 illustrates an example hierarchical arrangement of network elements of a NoC for which a transition state specification can be generated in accordance with an embodiment of present disclosure.

FIG. 5 illustrates an example hierarchical arrangement 500 of network elements of a NoC 502 for which a transition state specification can be generated in accordance with an embodiment of present disclosure. As shown in FIG. 5, the transition state specification for NoC 502 can include power profiles/properties of individual network elements/hardware components such as of master bridge 506, router 508, slave bridge-1 512, and slave bridge-2 516, or a subset of the network elements such as subset 522-1, subset 522-2, and subset 522-3, or superset 524 of the NoC 502. In an example implementation, a single transition state specification can be generated for the entire NoC 502 or for the superset 524. In another example implementation, transition state specification can be generated for subset of network elements such as subset 522-1, subset 522-2 and subset 522-3. Each subset of elements can include one more network elements or hardware elements, wherein each hardware/network element of a subset can operate in the same power domain. In another example implementation, transition state specification can be generated for each individual hardware element/network element such as master bridge 506, router 508, slave bridge-1 512, and slave bridge-2 516 of the NoC 502. In an embodiment, a single transition state specification can be generated for the entire NoC 502, wherein the transition state specification can include power profiles/properties at different hierarchical levels. In an example implementation, the transition state specification can be presented to verification functions for verifying the behavior of elements/components of the SoC/NoC or a subset of SoC/NoC or the entire SoC/NoC, in hierarchical manner. For instance, behavior of individual network elements/hardware elements such as master bridge 506, router 508, slave bridge 1 512, and slave bridge 2 516 can be verified at the individual element/unit level such as at level 520-1 or at level 520-4. In an example implementation, transition state specification can be used by the verification function for verifying the behavior/correctness/stability of the SoC/NoC at group/cell level, for instance, at the subset level 522-1, 522-2, and 522-3, or at the full-chip level 524. In an example implementation, the transition state specification can be used by verification function for verifying the behavior/correctness/stability either of an individual hardware element/component of the NoC 502, or across hardware elements of the NoC 502. In an example implementation, a subset/group/cell can be created for hardware elements/network elements that are operating in same power domain. For example, master bridge 506 and router 508 can be grouped together to form a subset 522-1 as both the master bridge 506 and router 508 may be operating at power domain-0 (PD0). Similarly, for other network elements operating in different power domains, different subsets can be created. For example, for slave bridge-1 512 operating in power domain-1 (PD1), and slave bridge-2 516 operating at power domain-2 (PD2), subset 522-2 and subset 522-3 can respectively be created. A transition state specification can be created for each subset 522-1, 522-2, and 522-3, wherein the transition state specification that includes information of each subset can be used for verification of behavior of the individual subsets.

In an embodiment of the present disclosure, the transition state specification can include one or more power profile verification templates that can be used for verifying the behavior of different elements/components of the NoC 502. In an example implementation, a single template can be used for verification of behavior/correctness/stability of master bridge 506, router 508, slave bridge-1 512, and slave bridge-2 516.

In an embodiment, transition state specification for the NoC 502 can be generated at the runtime or during simulation of the NoC 502. Power states, voltage values and other like power properties of each network element can be recorded/logged during the simulation or runtime of the NoC 502. In an example implementation, the generated transition state specification of NoC 502 can be used for verification of behavior of the SoC while switching from one power profile to another. In example implementation, power intent of the NoC 502 during runtime or during simulation can be written and stored in the transition state specification, which can be used for verification of correctness/compatibility with original input specification of the NoC 502.

In an aspect, the verification is made to ensure that the network is performing or showing an expected behavior and/or to ensure that the steps taken by the network elements during switching of power states or while they are stable are as planned and hence whether expected outcomes are being achieved. In an example implementation, the transition state specification can be used to inject events into a design during a hardware simulation for the SoC/NoC. In an example implementation, the transition state specification can be used for observing/checking values for input/output interfaces and wires to ensure compliance with a protocol specification for the NoC.

Figure 6A:
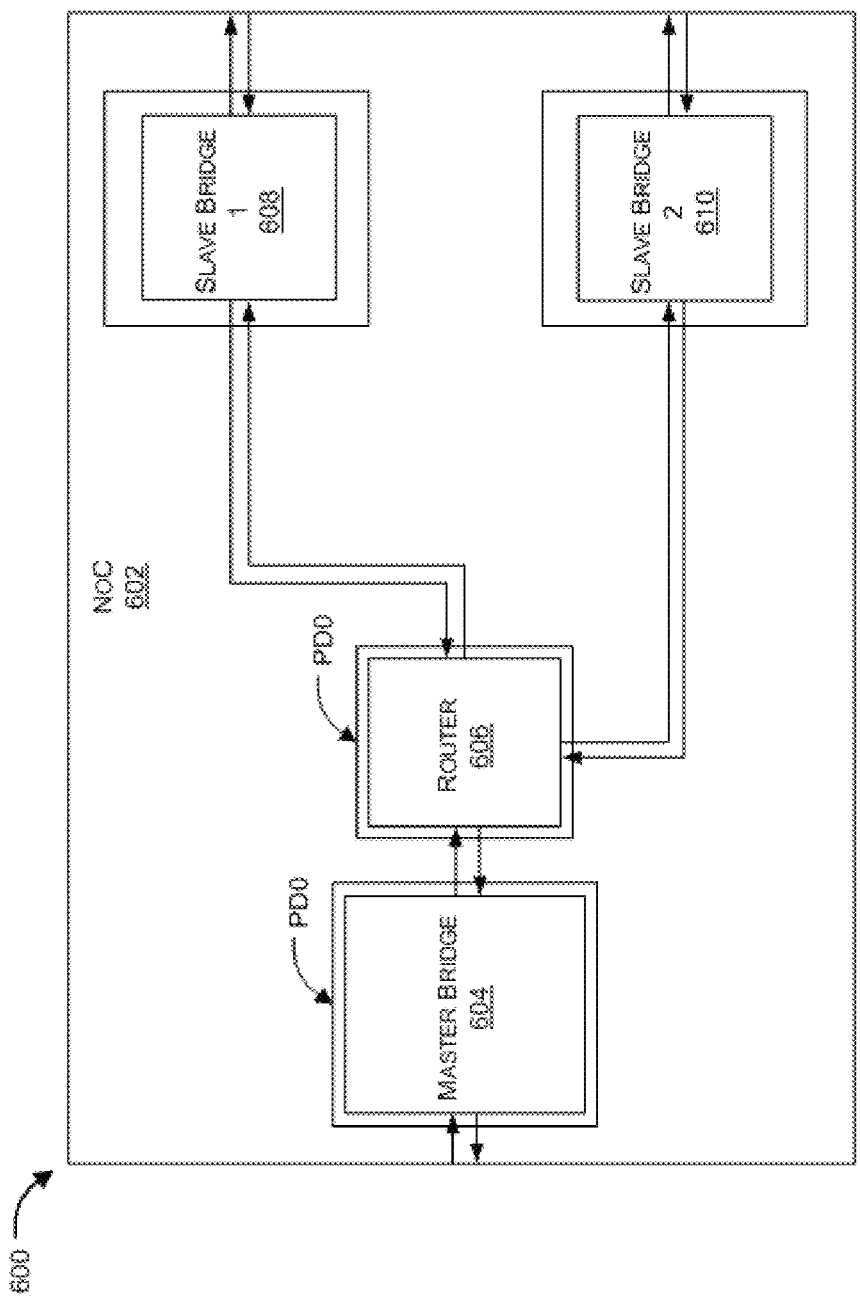
FIG. 6(a) illustrates an example NoC for which element level checkers can be created in accordance with an embodiment of the present disclosure.

In an embodiment, different checkers/verification functions can be included as part of the transition state specification, and these checkers/verification functions can be bound to perform at various levels. FIG. 6(a) illustrates an example NoC for which element level checker can be created in accordance with an embodiment of the present disclosure. In an example implementation, an expected transition state specification can incorporate one or more checkers or verification functions to verify the behavior/correctness of NoC while switching from one power profile to another. As shown in FIG. 6(a), for network elements, master bridge 604, router 606, slave bridge-1 608, and slave bridge-2 610, different checkers can be created/incorporated in the expected transition state specification. The expected transition state specification can be further used for verification of low power profile behavior of the elements while switching from one power profile to another. In an aspect, element level checkers are bound at every element level and be configured to verify that no new transactions are accepted after a power gate request, that no outstanding or pending transactions are present before going to power gating, and/or that all element outputs have consistent values maintained during idle state (before going to power gate), reset and isolation (during power gating).

Figure 6B:
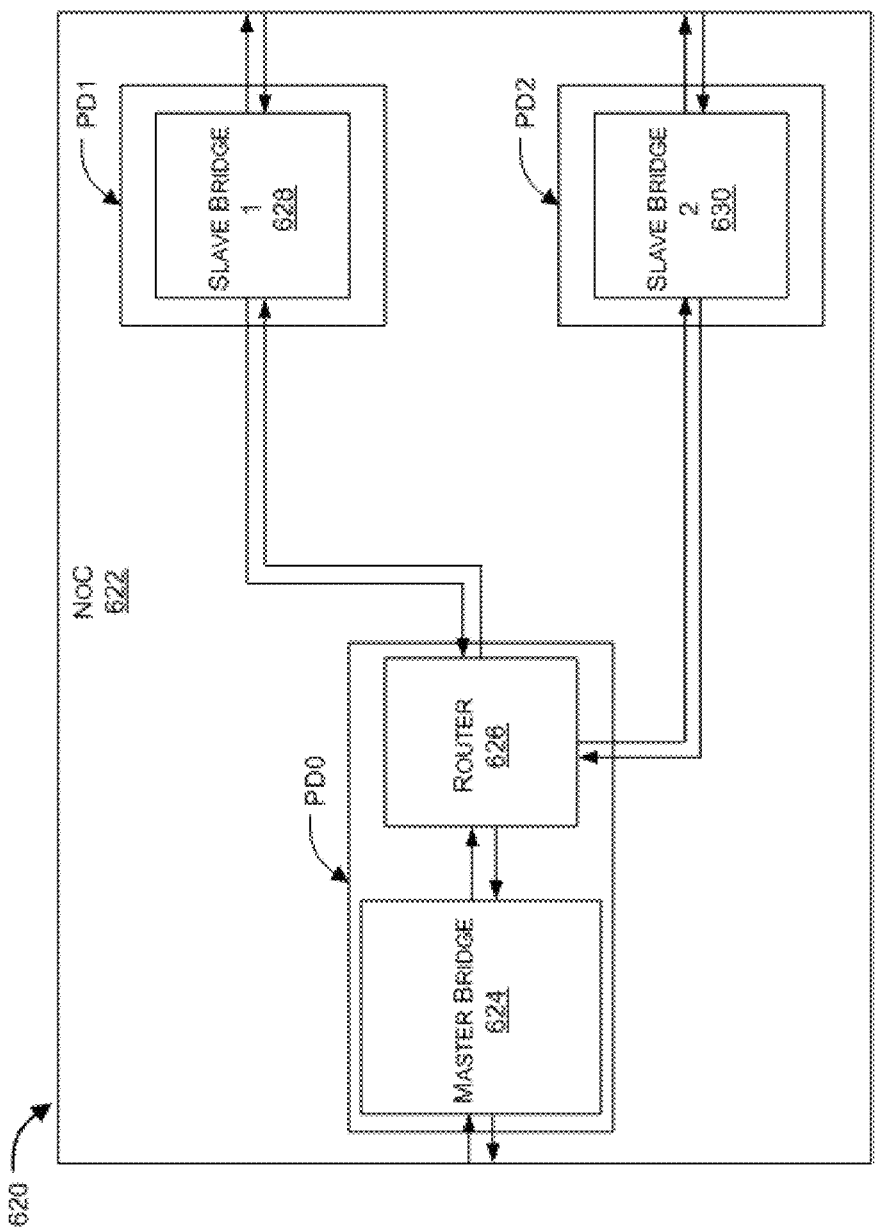
FIG. 6(b) illustrates an example NoC for which power domain level checkers can be created in accordance with an embodiment of the present disclosure.

FIG. 6(b) illustrates an example NoC for which power domain level checkers can be created in accordance with an embodiment of the present disclosure. In an example implementation, one or more network elements working in the same power domains can be logically grouped together and power domain level checkers can be created/incorporated in the expected transition state specification. As shown in the FIG. 6(b), the master bridge 624 and the router 626, working in the power domain-1 (PD1), can be grouped together and power domain level checkers or verification functions can be created/incorporated in the transition state specification. For example, different checkers can be created for slave bridge-1 628 that operates in power domain-2 (PD2), and for slave bridge-2 630 that operates in power domain-3 (PD3). In the present example, three sets of checkers can be created, one each for power domain-1, power domain-2, and power domain-3. In an example implementation, expected transition state specification can include information about expected power states of network elements when they change different power properties within the same power domain. For example, different possible power states of the master bridge 624 and the router 626 can be specified in the specification when the master bridge 624 and/or the router 626 switches from one set of power properties to another, while remaining in the same power domain. In an aspect, power domain level checkers can be bound at every power domain level (virtual or physical) hierarchies that are present and can be configured to verify that sequencing of power domain controls is in the expected order, that isolation presence is only when there is a domain crossing, and/or to check/verify the always-on power domain element LP behavior.

Figure 6C:
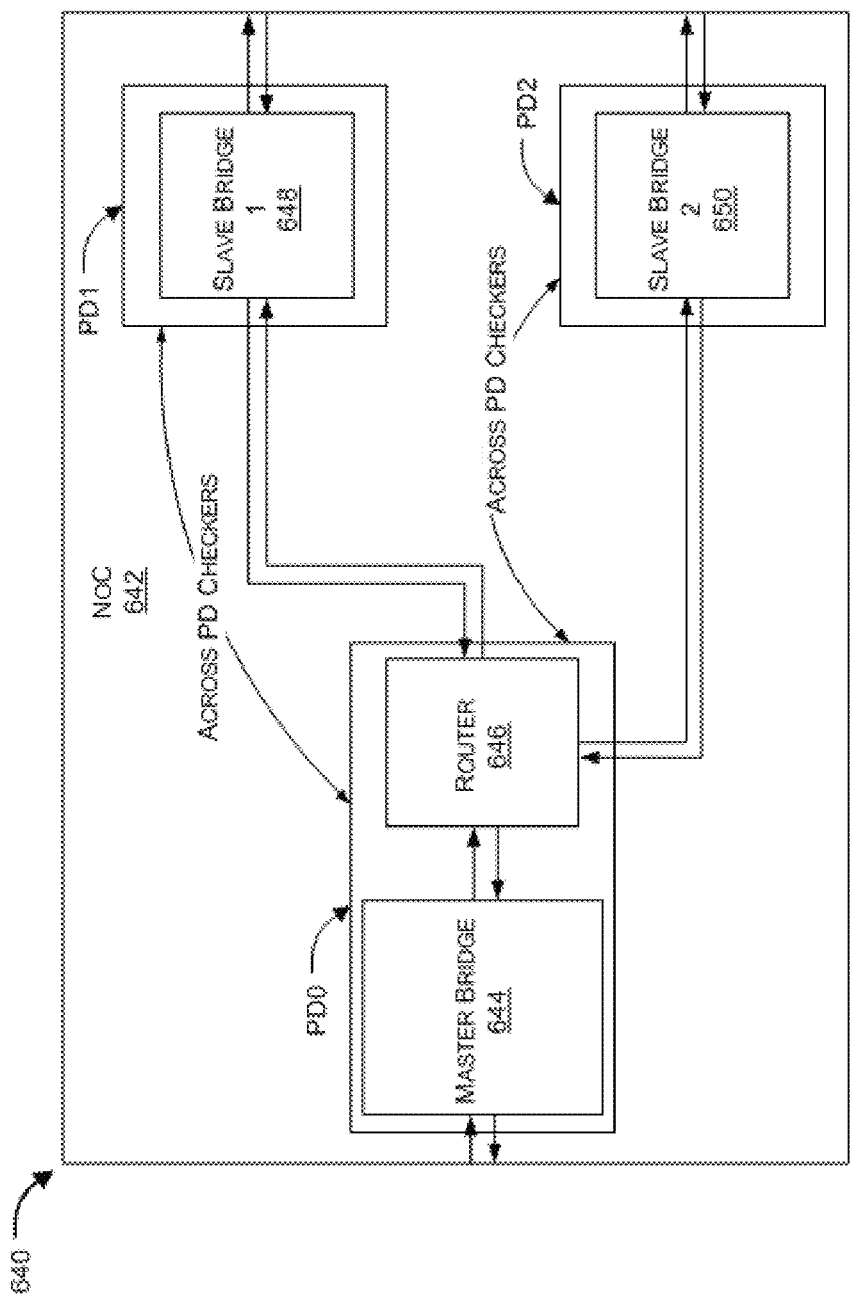
FIG. 6(c) illustrates an example NoC for which power domain checkers can be created across one or more network elements in accordance with an embodiment of the present disclosure.
Figure 6D:
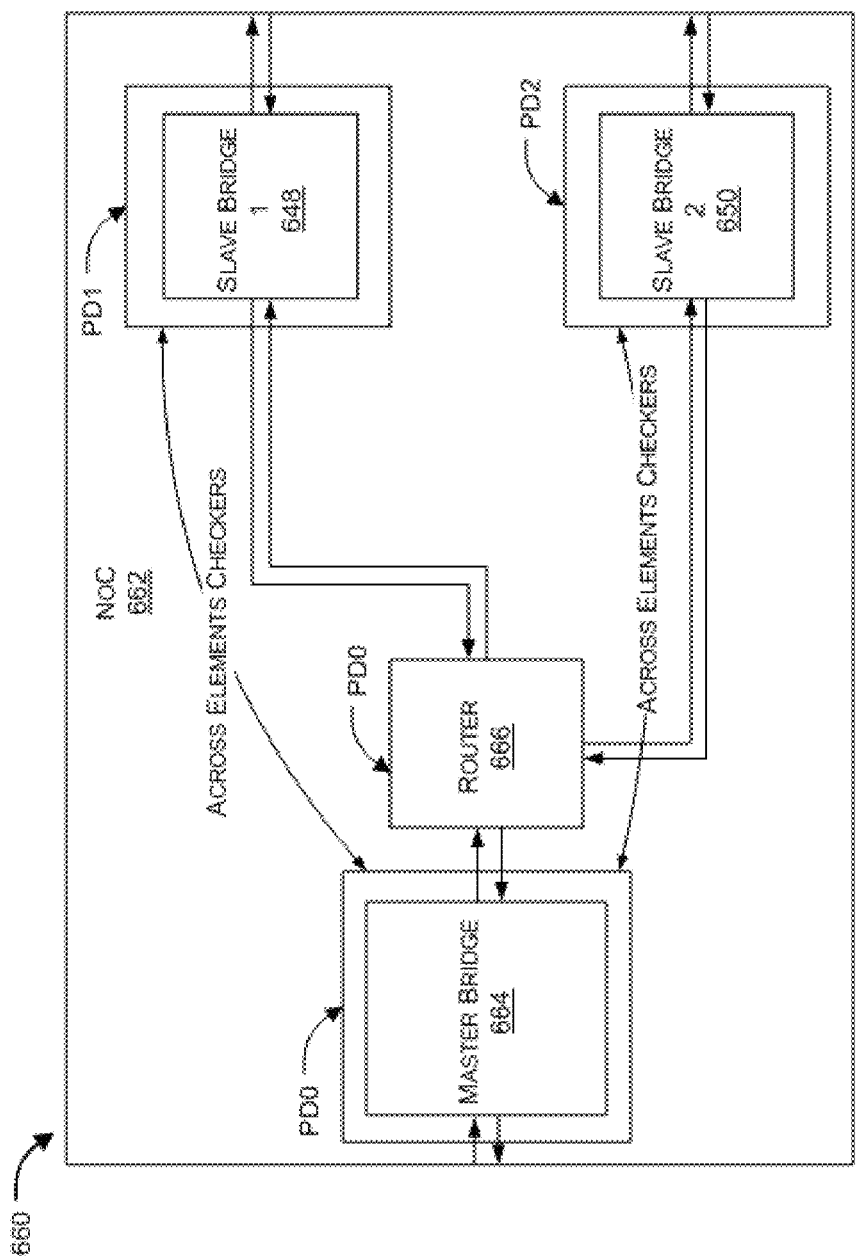
FIG. 6(d) illustrates an example NoC for which top level checkers can be created for transition of network elements from one power domain to another in accordance with an embodiment of the present disclosure.

FIGS. 6(c) and 6(d) illustrates an example NoC for which top level checkers can be created for transition of network elements from one power domain to another in accordance with an embodiment of the present disclosure. In an aspect, top level LP/dynamic checkers can be bound at NoC top level by observing the low power behavior across power domains and elements. In an aspect, power sequencing can be done across the power domains in an order such that all the elements present across power domains drain out their outstanding transactions. In another aspect, the power sequencing can be done across the elements in the given traffic profile in an order such that the connected masters to the given slaves are fenced and drained before starting power gating sequence of the slave. With reference to FIGS. 6(c) and 6(d) therefore, transactions for power domain PD0 can be drained out before transactions for power domains PD1 and PD2. FIG. 6(c) shows top level checkers that are configured across power domains, whereas FIG. 6(d) shows top level checkers that are configured across elements.

In an example implementation, different checkers can be bound to every power domain level at different virtual or physical hierarchies to verify the sequencing of power domain controls. The checkers can verify the sequence of issued power domain controls with respect to expected orders of sequences as provided in the input or design specification of the SoC/NoC. In an example implementation, the checkers can be configured to verify that the isolation is performed when there is a domain crossing.

In an example implementation, different checkers can be bound at NoC top level for observing and verifying low power behavior across power domains and elements. The checkers can verify whether the power sequencing done across the power domains is in order, or whether all elements present across power domains have drained/completed their outstanding/pending transactions before switching their power states. In an example implementation, different checkers can verify whether the power sequencing performed across elements in a given traffic profile are in expected order. In an example implementation, different checkers can verify whether masters that are connected to one or more slaves are fenced and drained before starting power gating sequence of the slaves.

Figure 7:
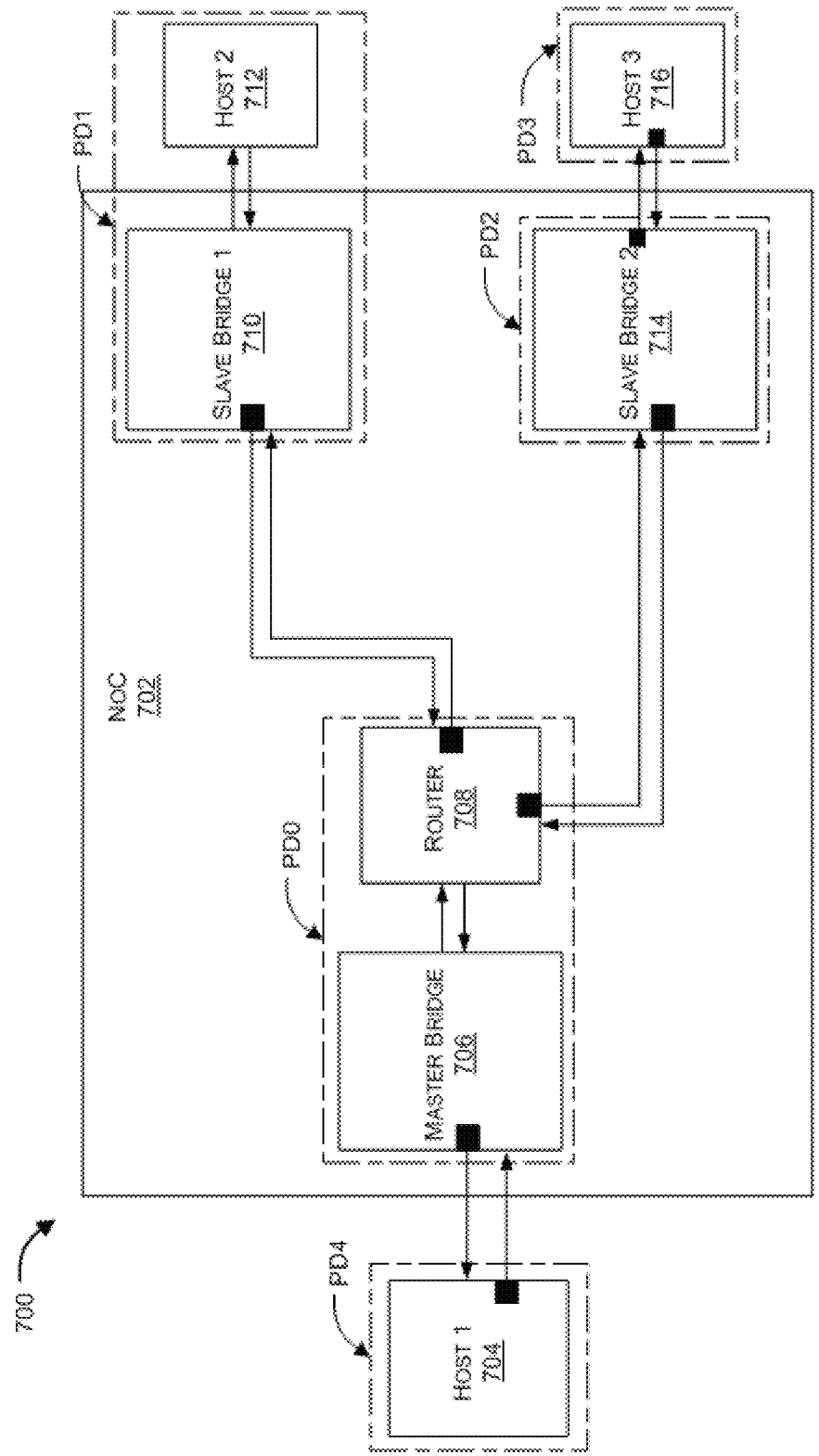
FIG. 7 illustrates an example NoC for which transition state specification incorporating isolation cells information can be generated in accordance with an embodiment of the present disclosure.

FIG. 7 illustrates an example NoC for which transition state specification incorporating isolation cells information can be generated in accordance with an embodiment of the present disclosure. FIG. 7 shows a simple low power configuration example, where a power controller controls the power profile/status of slave bridge-1 710 and slave bridge-2 714, which are configured to operate in different power domains. In the present illustration, the master bridge 706 and the router 708 can be configured to operate in the same power domain-1 (PD1), slave bridge-1 710 and host-2 712 can be configured to operate in power domain-2 (PD2), and slave bridge-2 714 can be configured to operate in power domain-3 (PD3), host-3 716 can be configured to operate in power domain-4 (PD4), and host-1 704 can be configured to operate in power domain-5 (PD5). When the network elements or hardware components of the NoC 702 switch from one power domain to another or the instruction to switch the power domain comes from a hardware element that operates in different power domains, an isolation can be configured to provide required safety and ensure smooth transition. In an aspect, the power profile/status can be controlled by a power controller.

In example implementation, an isolation cell can be physically or virtually placed at the network element boundaries when there is a power domain crossing. In an aspect, isolations are not present when there is no power domain crossing. The transition state specification for NoC 702 can be generated to enable the specification to incorporate functioning of the isolation cell, and isolation checks can be configured in the specification whenever power domain crossing is required.

In an example implementation, various checkers at different physical or virtual hierarchical levels can be incorporated to verify that the sequence of power domain controls is in the expected order and/or verify that isolation is provided when there is a power domain crossing. In an embodiment, the transition state specification can be generated and written in any hardware description language such as system verilog, which can be used by verification function to statically or dynamically verify the correctness/behavior of SoC/NoC, when one or more network elements/hardware elements of the SoC/NoC switch from one power profile to another.

In an example implementation, transition state specification incorporating all collaterals can be generated, which may incorporate information, including but not limited to, one or more of hierarchical common power format (CPF) files, low power aware register transfer level (RTL) checkers, low power sequence checkers, assertion IP, element level checkers, power domain level checkers, cross domain level checkers, across network element checkers, isolation (ISO) checkers, save restore (SR) checkers, verify power switch off (SFO) level checkers, low power sequences, element level checker, power domain level checkers, cross domain level checker, across network element checkers, templates, and verification functions. In an aspect, an assertion IP can include one or a combination of element level checker(s), domain level checker(s), across element checker(s), across power domain level checker(s), wherein the assertion IP can be redundant.

Figure 8:
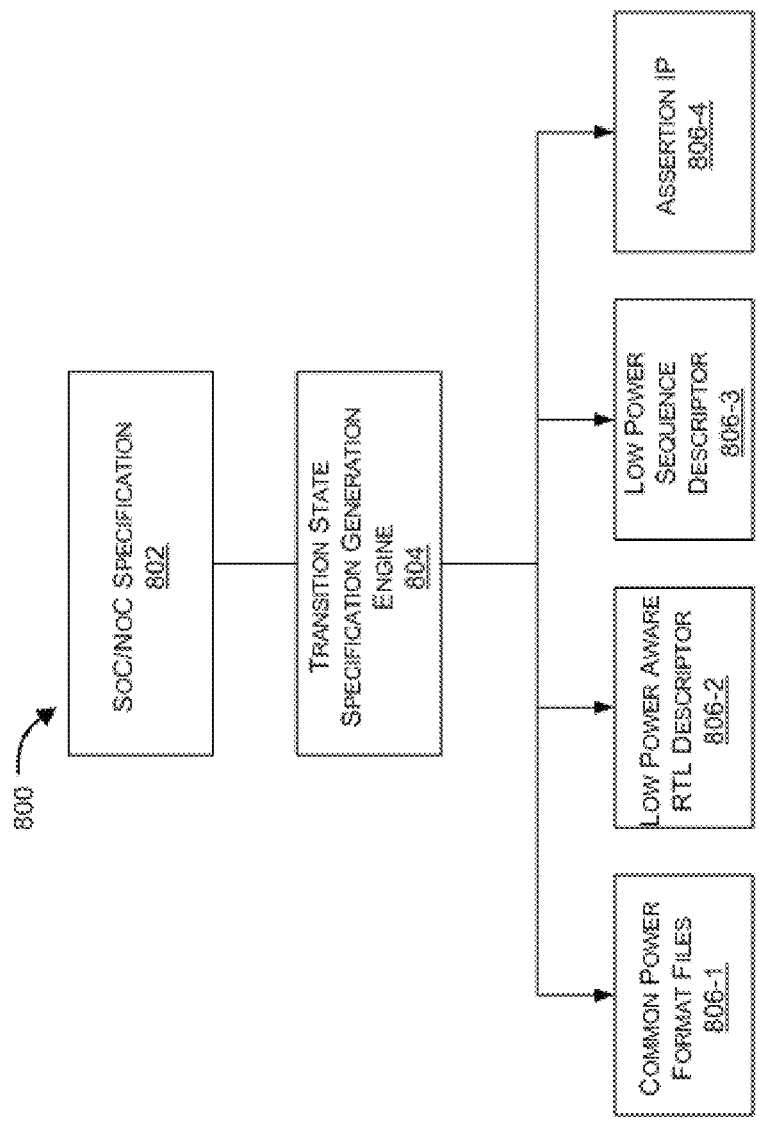
FIG. 8 illustrates an example block diagram of the transition state specification engine that generates the transition state specification for a given NoC/SoC specification in accordance with an embodiment of the present disclosure.

FIG. 8 illustrates an example block diagram 800 of the transition state specification engine that generates transition state specification for a given NoC/SoC specification in accordance with an embodiment of the present disclosure. As shown in FIG. 8, a transition state specification generation engine 804 can receive a NoC/SoC specification 802 that incorporates or comes along with traffic profile and power profile descriptions of different network elements and hardware elements. On receiving the NoC/SoC specification 802 along with the power profile descriptions and traffic profiles, the engine 804 can generate the transition state specification that may be in the form of hierarchical common power format (CPF) files 806-1, low power aware register transfer level (RTL) descriptor(s) 806-2, low power sequence descriptor(s) 806-3, and assertion IP 806-4. In an example implementation, the specification can include element level checker descriptor(s), power domain level checkers descriptor(s), cross domain level checker descriptor(s), across network element checkers descriptor(s), isolation (ISO) descriptor(s), save restore (SR) descriptor(s), and verify power switch off (SFO) level descriptor(s), among other low power information descriptors(s) of the SoC/NoC. In an example implementation, low power intent of the SoC/NoC can be captured in the CPF 1.1 standard or any other CPF files. In an example implementation, the transition state specification can be RTL design aware. A RTL design aware specification can be used for verifying the RTL compliance when the element of SoC/NoC switches from one power profile to another. In an example implementation, low power sequence descriptor 806-3 can be used to describe low power test sequences for doing power gating or enabling elements or power domains within NoC. In example implementation, low power sequence can be generated for customer reference or for internal testing of the SoC/NoC.

Figure 9:
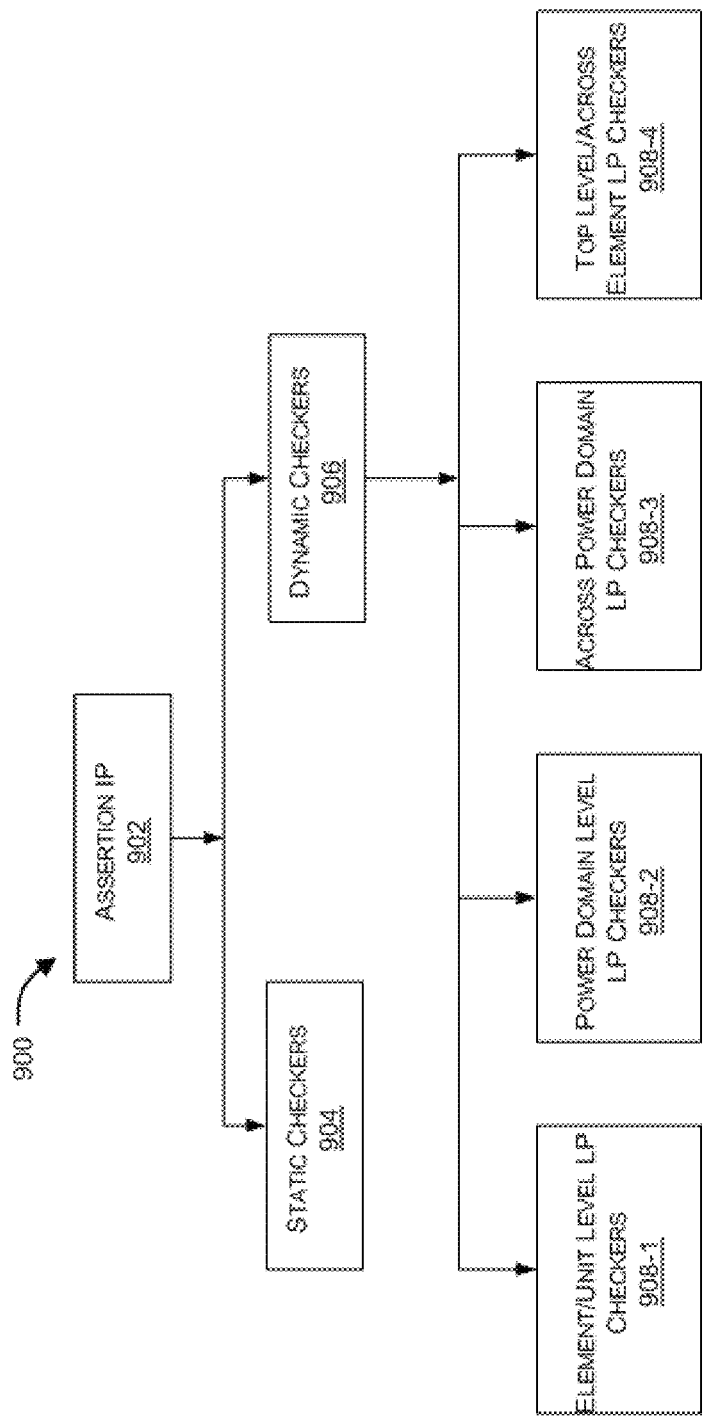
FIG. 9 illustrates an example block diagram of an assertion IP that includes different checkers in a transition state specification for a given NoC/SoC specification in accordance with an embodiment of the present disclosure.

FIG. 9 illustrates an example block diagram of an assertion IP that includes different checkers in a transition state specification for the given NoC/SoC specification in accordance with an embodiment of the present disclosure. As shown in FIG. 9, an assertion IP 902 can include static checkers 904 and dynamic checkers 906 for verification of behavior and/or correctness of the circuit. In an example implementation, the dynamic checkers can be incorporated at different levels such as at element/unit level or at a power domain level or across power domain levels or across elements/top level. Dynamic checkers 906 can include different checkers such as element/unit level low power checkers 908-1, power domain level low power checkers 908-2, across power domain low power checkers 908-3, and top level/across elements low power checkers 908-4. The transition state specification can further include one or more of these checkers in a hierarchical manner and use them for verifying the correctness or behavior of the SoC/NoC and to confirm whether the SoC/NoC is operating in compliance with the given specification and power properties.

FIG. 10(a) illustrates an example static checker for verifying the behavior of SoC/NoC in accordance with an embodiment of the present disclosure. As shown in the FIG. 10(a) static checkers 1006 gets information on input power intent from SoC/NoC specification 1002 file, such as from a NCF, and tuned power related information from a simulation engine 1004. The static checker 1006 can be configured to verify low power static related information received from simulation engine against the CPFs 1008, LP aware RTL 1010 and sequences 1012 generated by the transition state specification generation engine. In example implementation, the static checkers can be performed after the transition state specification incorporating the collaterals is generated by the transition state specification generation engine. Some of these checks against collateral include, CPF checks where all the generated CPFs can be matched with respect to count and naming, where the RTL module or instance name included in the CPFs are correct, or whether the power domains referred in the CPFs are in compliance with the input specification 1002 (NCF), or whether network element's power domains are as expected based on the tune power algorithm, or whether the generated power profiles are in compliance with the input specification 1002 (NCF). In an example implementation, LP aware RTL checks can be performed to verify where the low power information captured by the RTL components are in compliance with the design RTL parameters based on power domains or power profiles defined in the input specification 1002 (NCF), or the verify the integration of the low power controls in the design. In an example implementation, sequence checks can be performed to verify whether the order of input or test sequences are issued correctly or not, and whether the response in case of invalid sequences are correct or not.

FIG. 10(b) illustrates an example dynamic checkers for verifying the behavior of SoC/NoC in accordance with an embodiment of the present disclosure. As shown in the FIG. 10(b) dynamic checkers 1056 gets information on input power intent from SoC/NoC specification file, such as from a NCF 1052, and sequence checker with test cases 1054. The dynamic checkers 1006 can be captured or incorporated as templates in the transition state specification and can be instantiated at respective hierarchies of the design to verify the low power intent specified in the CPFs 1058 and LP aware RTL design 1060 during simulation or during runtime of the SoC/NoC. One or more checkers can be configured to perform the verification function at different levels, wherein, for instance, these checkers can fail the simulation whenever the power intent is violated during simulations. Dynamic checkers can also be associated with one or more NoC elements and can be configured to verify that no new transactions are accepted by the NoC elements after receiving the power gate request. In another example implementation, dynamic checkers can be configured to verify that no outstanding or pending transactions are present with the element before going to power gating. In another example implementation, dynamic checkers can be configured to verify that all element outputs have consistent values maintained during ideal state i.e. before going to power gate, during reset or during isolation, i.e. during power gating.

In an example implementation, different checkers can be associated at every power domain level at different virtual or physical hierarchies to verify the sequencing of power domain controls. The checkers can verify the sequence of issued power domain controls with respect to expected order of sequence as provided in the input or design specification of the SoC/NoC. In an example implementation, the checkers can be configured to verify that the isolation is performed only when there is a domain crossing.

In an example implementation, different checkers can be associated at the NoC top level for observing and verifying low power behavior across power domains and NoC elements. The checkers can verify whether the power sequencing done across the power domains is in order and/or whether all elements present across the power domains have drained/completed their outstanding transactions. In an example implementation, different checkers can be configured to verify whether the power sequencing done across elements in a given traffic profile is in expected order. In an example implementation, different checkers can verify whether masters that are connected to one or more slaves are fenced and drained before starting power gating sequence of the one or more slaves.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

What is claimed is:

1. A method, comprising:
  generating a specification comprising information regarding low power behavior of a chip implementing a Network on Chip (NoC), the information configured to provide a function for checking the behavior of the chip for correctness of the NoC for at least one of:
    when switching from one power profile comprising a first set of on/off statuses for bridges and routers of the NoC to another power profile comprising a second set of on/off statuses for the bridges and the routers of the NoC, and
    in a stable state of a power profile comprising a set of on/off statuses for the bridges and the routers of the NoC from an input comprising parameter information for at least one of: voltage level, clock, power domain, and traffic for the NoC;
  wherein the generating the specification comprises generating one or more assertions or invariants in one or more files in a language utilized by a verification methodology applying the function for the checking the behavior of the chip for the correctness of the NoC.

2. The method of claim 1, wherein the generated specification is configured to support both dynamic and static checks on a design and a power intent of the NoC.

3. The method of claim 1, wherein the generating the specification is conducted hierarchically, wherein the specification is configured to be represented hierarchically for the NoC.

4. The method of claim 1, wherein the generated specification is configured to provide the function for checking the correctness of the chip at a unit-level or a full-chip level of the NoC.

5. The method of claim 1, where the function is configured to check the behavior either within a hardware element or across hardware elements of the NoC.

6. The method of claim 1, further comprising checking the generated specification for correctness of automatically generated power intent of the NoC, against an original input specification of the NoC.

7. The method of claim 1, further comprising running a set of tests for the NoC, and determining coverage of conditions met of the set of tests from the generated specification.

8. The method of claim 1, further comprising utilizing the generated specification to inject events into a design during a hardware simulation for the NoC for one or more conditions.

9. The method of claim 1, further comprising utilizing the generated specification for checking values for at least one of an interface and a wire for compliance with a protocol specification for the NoC.

10. A non-transitory computer readable medium storing instructions for executing a process, the instructions comprising:
  generating a specification comprising information regarding low power behavior of a chip implementing a Network on Chip (NoC), the information configured to provide a function for checking the behavior of the chip for correctness of the NoC for at least one of:
    when switching from one power profile comprising a first set of on/off statuses for bridges and routers of the NoC to another power profile comprising a second set of on/off statuses for the bridges and the routers of the NoC, and
    in a stable state of a power profile comprising a set of on/off statuses for the bridges and the routers of the NoC from an input comprising parameter information for at least one of: voltage level, clock, power domain, and traffic for the NoC;
  wherein the generating the specification comprises generating one or more assertions or invariants in one or more files in a language utilized by a verification methodology applying the function for the checking the behavior of the chip for the correctness of the NoC.

11. The non-transitory computer readable medium of claim 10, wherein the generated specification is configured to support both dynamic and static checks on a design and a power intent of the NoC.

12. The non-transitory computer readable medium of claim 10, wherein the generating the specification is conducted hierarchically, wherein the specification is configured to be represented hierarchically for the NoC.

13. The non-transitory computer readable medium of claim 10, wherein the generated specification is configured to provide the function for checking the correctness of the chip at a unit-level or a full-chip level of the NoC.

14. The non-transitory computer readable medium of claim 10, where the function is configured to check the behavior either within a hardware element or across hardware elements of the NoC.

\* \* \* \* \*